United States Patent
Ranjan et al.

(10) Patent No.: US 10,474,556 B2
(45) Date of Patent: Nov. 12, 2019

(54) MULTIPLE RULESET VERSION SCANNING, WARNING AND CORRECTION TOOL

(71) Applicant: Bank of America Corporation, Charlotte, NC (US)

(72) Inventors: Prabhat Ranjan, Plano, TX (US); Nurani R. Parasuraman, Irving, TX (US); Rajsekhar Singha Roy, Addison, TX (US); Sireesha K. Gorantla, Frisco, TX (US); Febby John Oommen, Chennai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 15/900,515

(22) Filed: Feb. 20, 2018

(65) Prior Publication Data

US 2019/0258565 A1 Aug. 22, 2019

(51) Int. Cl.
G06F 9/44 (2018.01)
G06F 9/445 (2018.01)
G06F 11/36 (2006.01)
G06F 3/0482 (2013.01)
G06F 16/22 (2019.01)

(52) U.S. Cl.
CPC ........ *G06F 11/3664* (2013.01); *G06F 3/0482* (2013.01); *G06F 11/3616* (2013.01); *G06F 16/22* (2019.01)

(58) Field of Classification Search
CPC .... G06F 11/3644; G06F 16/22; G06F 3/0482; G06F 11/3616; G06F 11/3664
See application file for complete search history.

(56) References Cited

U.S. PATENT DOCUMENTS

| | | | |
|---|---|---|---|
| 4,558,413 A | 12/1985 | Schmidt et al. | |
| 4,912,637 A | 3/1990 | Sheedy et al. | |
| 5,649,200 A | 7/1997 | Leblang et al. | |
| 5,675,802 A | 10/1997 | Allen et al. | |

(Continued)

OTHER PUBLICATIONS

Claudio Araujo, Investigating the Correspondence between Mutations and Static Warnings, 2015, pp. 1-10. https://ieeexplore.ieee.org/stamp/stamp.jsp?tp=&arnumber=7328004 (Year: 2015).*

(Continued)

*Primary Examiner* — Mongbao Nguyen
(74) *Attorney, Agent, or Firm* — Michael A. Springs; Moore & Van Allen PLLC; James C. Edwards

(57) ABSTRACT

A system executes multiple ruleset version scanning, warning and correction using a Software Deployment Management (SDM) environment such as Pega®. The system presents a code scanning interface to a user; receives input from the user selecting input rulesets comprising at least one ruleset and at least one version of the ruleset for scanning; accesses a guiderail database comprising a plurality of guiderails configured as best practices for SDM application development; scans the input rulesets comprising applying at least a portion of the plurality of guiderails to each of the input rulesets; and determines which of the input rulesets comprise compliance issues and a severity of each of the compliance issues; and presents an indication of severity of compliance issues for each of the input rulesets to the user using the code scanning interface.

17 Claims, 9 Drawing Sheets

(56) References Cited

U.S. PATENT DOCUMENTS

| | | | |
|---|---|---|---|
| 5,845,128 A | 12/1998 | Noble et al. | |
| 5,903,897 A | 5/1999 | Carrier, III et al. | |
| 6,073,214 A | 6/2000 | Fawcett | |
| 6,094,679 A | 7/2000 | Teng et al. | |
| 6,223,343 B1 | 4/2001 | Hopwood et al. | |
| 6,385,768 B1 | 5/2002 | Ziebell | |
| 7,069,541 B2 | 6/2006 | Dougherty et al. | |
| 7,134,122 B1 | 11/2006 | Sero et al. | |
| 7,146,608 B1 | 12/2006 | Newman et al. | |
| 7,149,699 B2 | 12/2006 | Barnard et al. | |
| 7,496,645 B2 | 2/2009 | Yeung et al. | |
| 7,680,932 B2 | 3/2010 | Defaix et al. | |
| 8,176,484 B2 | 5/2012 | Sero et al. | |
| 8,365,140 B2 | 1/2013 | Heyhoe et al. | |
| 8,438,562 B2 | 5/2013 | Sero et al. | |
| 8,677,315 B1 | 3/2014 | Anderson et al. | |
| 8,813,067 B2 | 8/2014 | Sero et al. | |
| 9,098,333 B1* | 8/2015 | Obrecht | G06F 9/50 |
| 9,141,382 B2 | 9/2015 | Heyhoe et al. | |
| 9,264,395 B1* | 2/2016 | Stamos | H04L 61/1511 |
| 9,286,187 B2 | 3/2016 | Brucker et al. | |
| 9,606,903 B2 | 3/2017 | Murugesan | |
| 9,658,833 B2 | 5/2017 | Heyhoe et al. | |
| 10,114,637 B1* | 10/2018 | Willson | G06F 8/71 |
| 10,216,432 B1* | 2/2019 | Kulkarni | G06F 3/067 |
| 2004/0060044 A1 | 3/2004 | Das et al. | |
| 2004/0261053 A1 | 12/2004 | Dougherty et al. | |
| 2006/0271341 A1 | 11/2006 | Brown et al. | |
| 2007/0143851 A1* | 6/2007 | Nicodemus | G06F 11/3495 726/25 |
| 2009/0019420 A1 | 1/2009 | Johnson | |
| 2009/0300580 A1 | 12/2009 | Heyhoe et al. | |
| 2010/0131939 A1 | 5/2010 | Hieb et al. | |
| 2010/0257151 A1 | 10/2010 | Lohman et al. | |
| 2010/0299327 A1 | 11/2010 | Kiefer et al. | |
| 2010/0299663 A1* | 11/2010 | Weissman | G06F 8/71 717/170 |
| 2010/0318969 A1 | 12/2010 | Petrovicky et al. | |
| 2013/0290195 A1* | 10/2013 | Frazier | G06Q 30/0278 705/306 |
| 2014/0222522 A1* | 8/2014 | Chait | G06Q 10/0637 705/7.36 |
| 2014/0331277 A1* | 11/2014 | Frascadore | H04L 63/20 726/1 |
| 2015/0100940 A1* | 4/2015 | Mockus | G06F 8/70 717/101 |
| 2015/0293834 A1* | 10/2015 | Potdar | G06F 8/30 717/131 |
| 2016/0292066 A1* | 10/2016 | Stevens | G06F 11/3624 |
| 2016/0378434 A1 | 12/2016 | Martick | |
| 2017/0093910 A1 | 3/2017 | Gukal et al. | |
| 2017/0124617 A1* | 5/2017 | Spoelstra | G06Q 30/0621 |
| 2017/0244761 A1* | 8/2017 | Baukes | H04L 41/0816 |
| 2017/0249644 A1* | 8/2017 | DiMaggio | G06Q 30/018 |
| 2017/0372247 A1 | 12/2017 | Tauber et al. | |
| 2018/0025011 A1* | 1/2018 | Aksionkin | H04L 63/20 707/692 |
| 2018/0275986 A1 | 9/2018 | Ghosh et al. | |
| 2019/0019095 A1* | 1/2019 | Mietke | G06N 5/047 |
| 2019/0079734 A1* | 3/2019 | Kadam | G06F 8/30 |
| 2019/0129994 A1* | 5/2019 | Astigarraga | G06F 16/2425 |

OTHER PUBLICATIONS

Raghudeep Kannavara, Securing Opensource Code via Static Analysis, 2012, pp. 1-8 https://ieeexplore.ieee.org/stamp/stamp.jsp?tp=&arnumber=6200135 (Year: 2012).*

Paul Anderson, Coding Standards for High-Confidence Embedded Systems, 2008, pp. 1-7. https://ieeexplore.ieee.org/stamp/stamp.jsp?tp=&arnumber=4753206 (Year: 2008).*

Andreas Wagner, Using the Juliet Test Suite to Compare Static Security Scanners, 2016, pp. 1-9. https://ieeexplore.ieee.org/stamp/stamp.jsp?tp=&arnumber=7509496 (Year: 2016).*

* cited by examiner

MULTIPLE RULESET VERSION SCANNING, WARNING AND CORRECTION TOOL

FIELD

The present invention relates to business process management software. More specifically, it relates to multiple ruleset version scanning, warning and correction.

BACKGROUND

Today there are many steps application developers must complete to deploy certain software within an entity. There is a need for assisting developers with a tool for scanning, warning and correcting ruleset version errors.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for executing multiple ruleset version scanning, warning and correction using a Software Deployment Management (SDM) environment such as Pega®. The system embodiments may comprise one or more memory devices having computer readable program code stored thereon, a communication device, and one or more processing devices operatively coupled to the one or more memory devices.

According to embodiments of the invention, a system for executing multiple ruleset version scanning, warning and correction using a Software Deployment Management (SDM) environment includes one or more memory devices; one or more processing devices operatively coupled with the one or more memory devices, wherein the processing device is configured to execute computer-readable program code to present a code scanning interface to a user; receive input from the user selecting input rulesets comprising at least one ruleset and at least one version of the ruleset for scanning; access a guiderail database comprising a plurality of guiderails configured as best practices for SDM application development; scan the input rulesets comprising applying at least a portion of the plurality of guiderails to each of the input rulesets; and determining which of the input rulesets comprise compliance issues and a severity of each of the compliance issues; and present an indication of severity of compliance issues for each of the input rulesets to the user using the code scanning interface.

In some embodiments, the processing device is further configured to execute computer-readable program code to receive a user's selection of an input ruleset for correction; open the selected input ruleset and enable correction of the compliance issue; and save the corrected input ruleset as a corrected ruleset. In some such embodiments, the processing device is further configured to execute computer-readable program code to assign a new version number to the corrected ruleset; and save the corrected ruleset as the new version number.

In some embodiments, the processing device is further configured to execute computer-readable program code to receive and store as part of the guiderail database a standard guiderail set and a custom guiderail set. In some such embodiments, the processing device is further configured to execute computer-readable program code to enable the code scanning interface to accept input regarding which of the standard guiderail set and the custom guiderail set to apply during a scan of input rulesets.

In some embodiments, the processing device is further configured to execute computer-readable program code to receive a ruleset version minimum and a ruleset version maximum, thereby identifying the input rulesets using the code scanning interface.

In some embodiments, the processing device is further configured to execute computer-readable program code to evaluate a compliance score associated with each of the input ruleset versions; and present a representation of the compliance score to the user using the code scanning interface.

According to embodiments of the invention, a computer program product for executing multiple ruleset version scanning, warning and correction using a Software Deployment Management (SDM) environment has at least one non-transitory computer readable medium comprising computer readable instructions. The instructions, when executed by a computer processor, cause the computer processor to present a code scanning interface to a user; receive input from the user selecting input rulesets comprising at least one ruleset and at least one version of the ruleset for scanning; access a guiderail database comprising a plurality of guiderails configured as best practices for SDM application development; scan the input rulesets comprising applying at least a portion of the plurality of guiderails to each of the input rulesets; and determining which of the input rulesets comprise compliance issues and a severity of each of the compliance issues; and resent an indication of severity of compliance issues for each of the input rulesets to the user using the code scanning interface.

In some embodiments, the computer readable instructions further cause the computer processor to receive a user's selection of an input ruleset for correction; open the selected input ruleset and enable correction of the compliance issue; save the corrected input ruleset as a corrected ruleset. In some such embodiments, the computer readable instructions further cause the computer processor to assign a new version number to the corrected ruleset; and save the corrected ruleset as the new version number.

In some embodiments, the computer readable instructions further cause the computer processor to receive and store as part of the guiderail database a standard guiderail set and a custom guiderail set. In some such embodiments, the computer readable instructions further cause the computer processor to enable the code scanning interface to accept input regarding which of the standard guiderail set and the custom guiderail set to apply during a scan of input rulesets.

In some embodiments, the computer readable instructions further cause the computer processor to receive a ruleset version minimum and a ruleset version maximum, thereby identifying the input rulesets using the code scanning interface.

In some embodiments, the computer readable instructions further cause the computer processor to evaluate a compliance score associated with each of the input ruleset versions;

and present a representation of the compliance score to the user using the code scanning interface.

According to embodiments of the invention, a computer implemented method for executing multiple ruleset version scanning, warning and correction using a Software Deployment Management (SDM) environment includes presenting a code scanning interface to a user; receiving input from the user selecting input rulesets comprising at least one ruleset and at least one version of the ruleset for scanning; accessing a guiderail database comprising a plurality of guiderails configured as best practices for SDM application development; scanning the input rulesets comprising applying at least a portion of the plurality of guiderails to each of the input rulesets; and determining which of the input rulesets comprise compliance issues and a severity of each of the compliance issues; and presenting an indication of severity of compliance issues for each of the input rulesets to the user using the code scanning interface.

In some embodiments, the method includes receiving a user's selection of an input ruleset for correction; opening the selected input ruleset and enable correction of the compliance issue; and saving the corrected input ruleset as a corrected ruleset. In some such embodiments, the method also includes assigning a new version number to the corrected ruleset; and saving the corrected ruleset as the new version number.

In some embodiments, the method includes receiving and storing as part of the guiderail database a standard guiderail set and a custom guiderail set. In some such embodiments, the method includes enabling the code scanning interface to accept input regarding which of the standard guiderail set and the custom guiderail set to apply during a scan of input rulesets.

In some embodiments, the method includes receiving a ruleset version minimum and a ruleset version maximum, thereby identifying the input rulesets using the code scanning interface.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
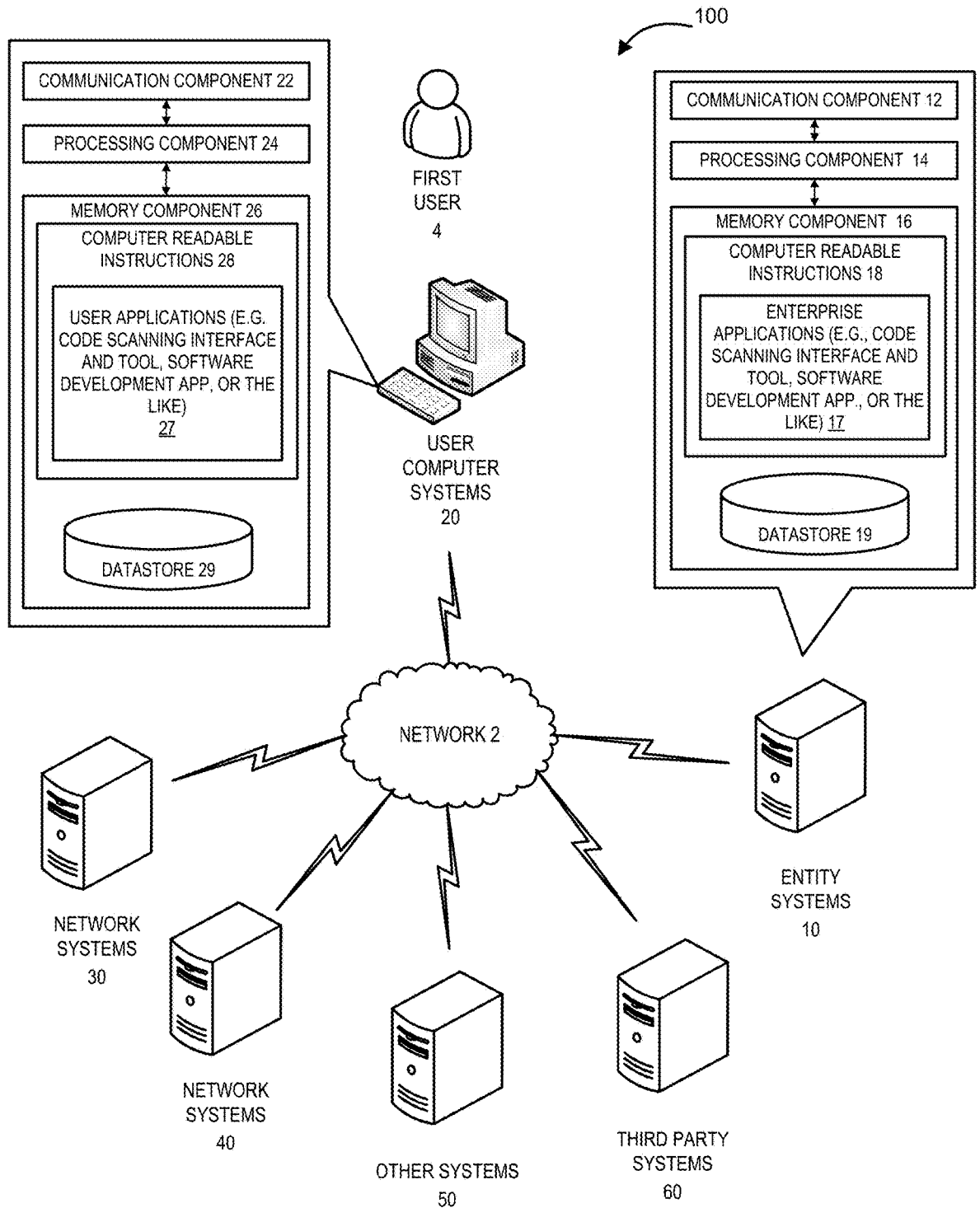

Having thus described embodiments of the invention in general terms, reference will now be made to the accompanying drawings, where:

FIG. 1 illustrates a block diagram illustrating an environment in which embodiments of the invention operate, in accordance with embodiments of the present invention.

Figure 2:
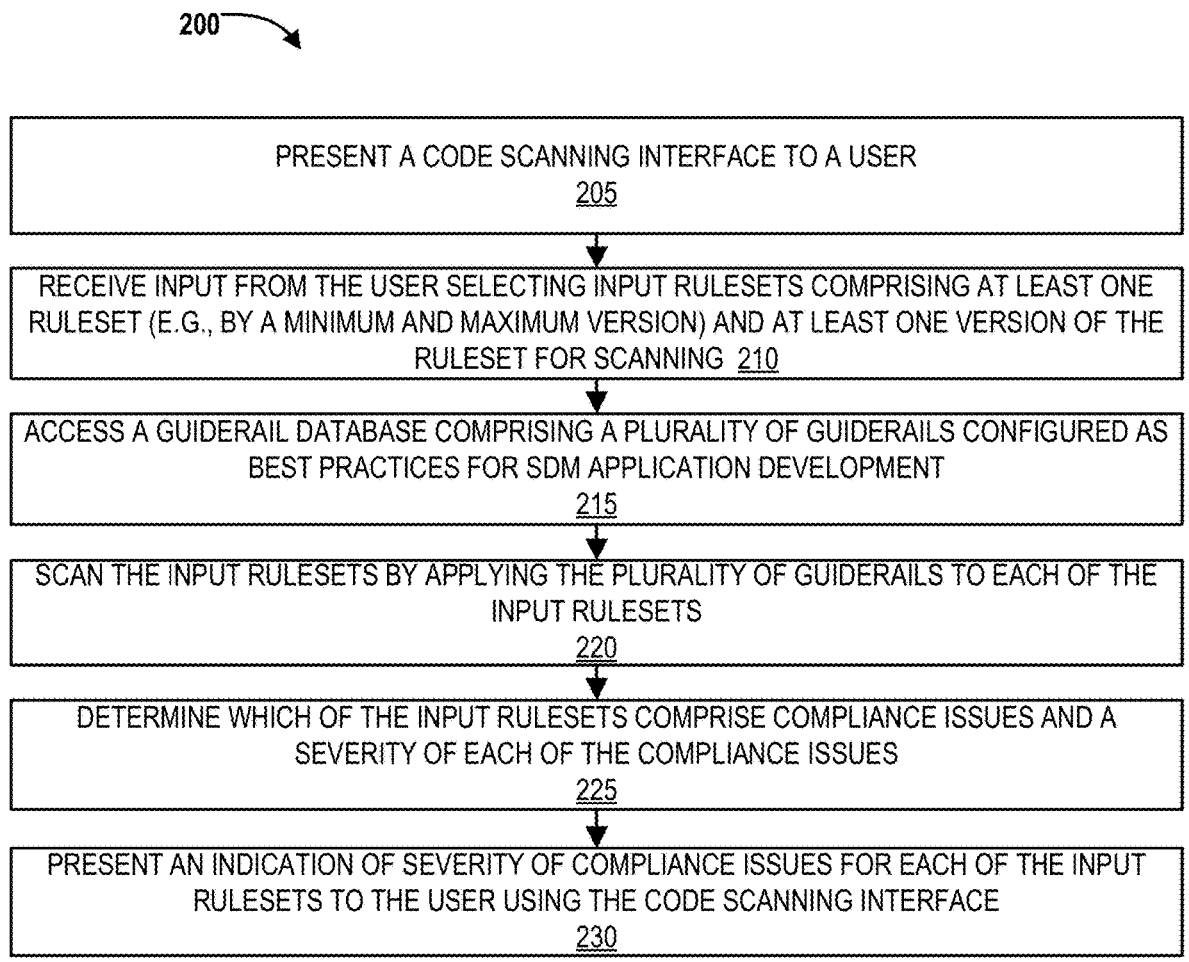

FIG. 2 illustrates a flowchart of a method for executing multiple ruleset version scanning, warning and correction according to embodiments of the invention.

Figure 3:
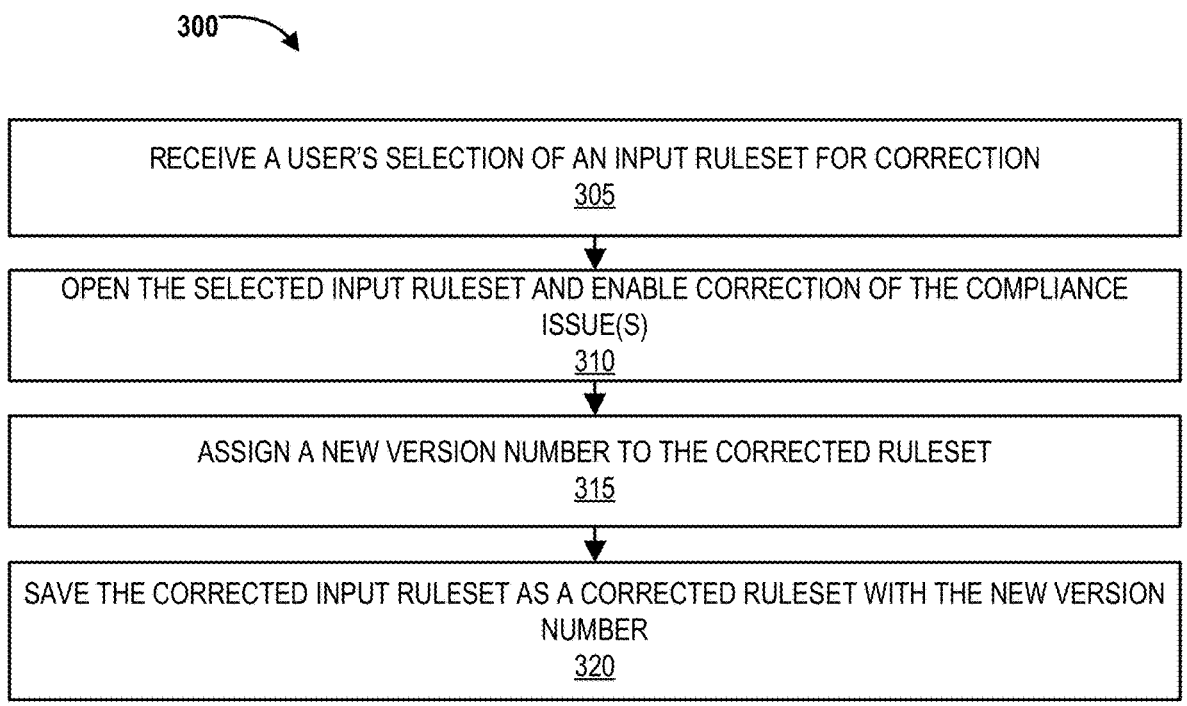

FIG. 3 illustrates a flowchart of a method for executing multiple ruleset version correction according to embodiments of the invention.

Figure 4:
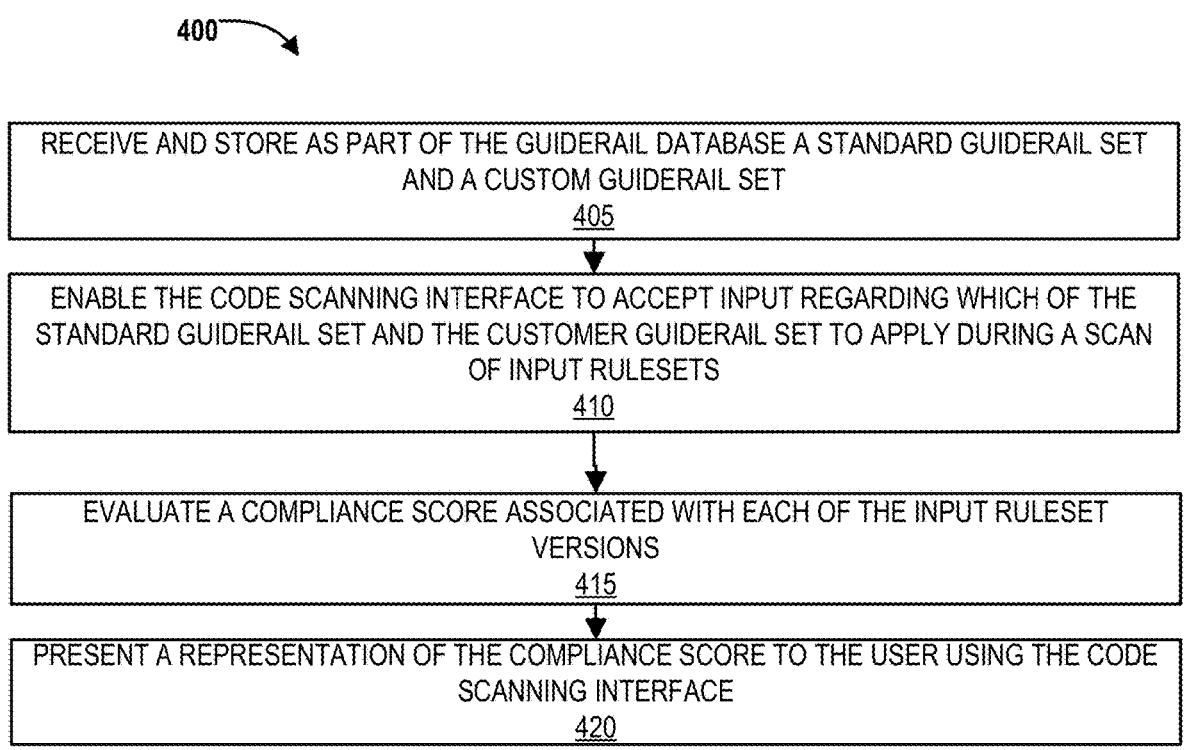

FIG. 4 illustrates a flowchart of a method for executing multiple ruleset version scanning, warning and correction according to embodiments of the invention.

FIGS. 5A-5D illustrate screenshots from a code scanning interface according to embodiments of the invention.

Figure 6:
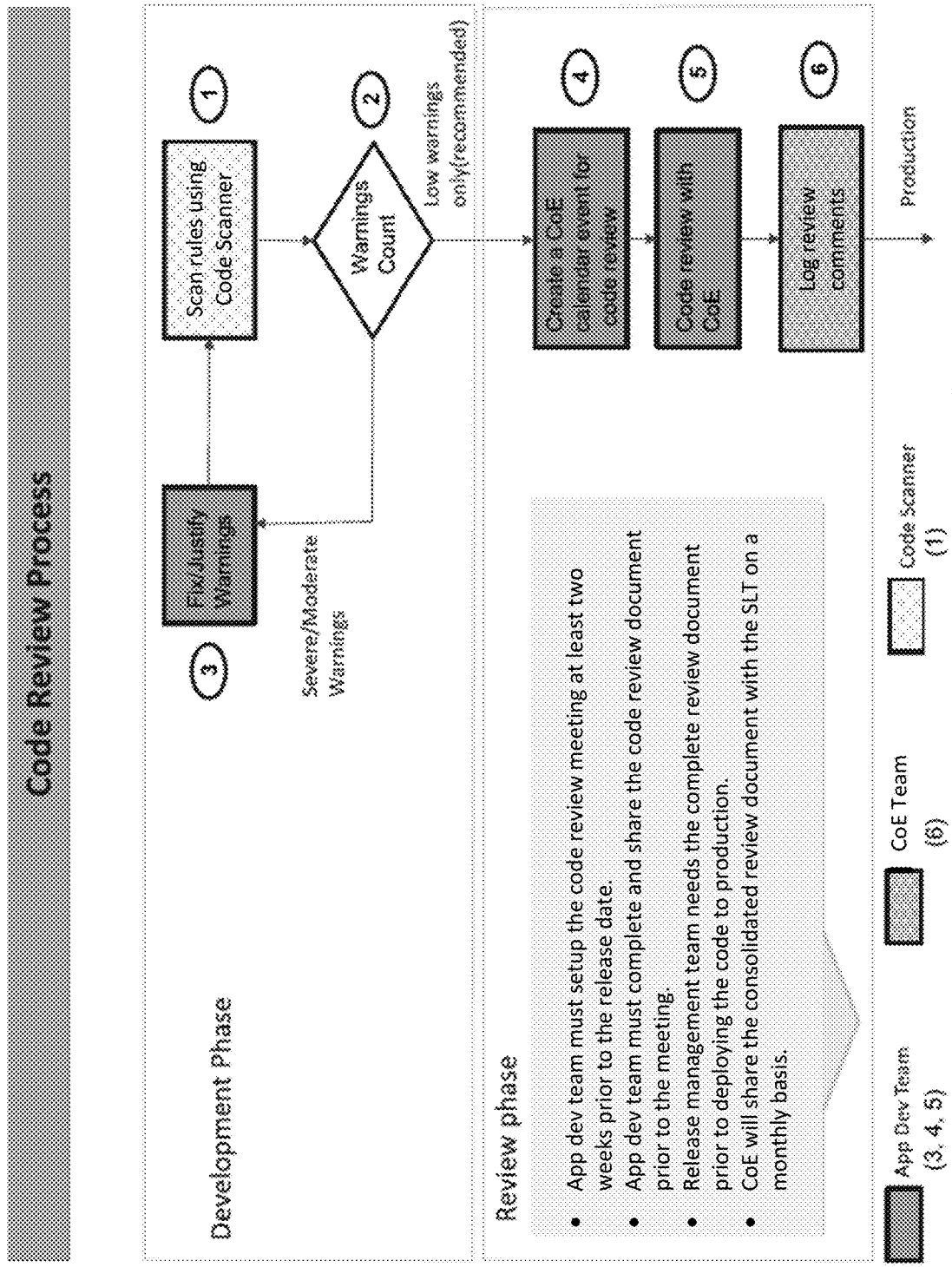

FIG. 6 illustrates a method for code review using a code scanning tool according to embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

To "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information. To "maintain" or to provide "maintenance" is to manage, update, or retain something. In some embodiments "maintaining" may include housing or storing a database or server on hardware and/or software associated with a maintaining entity. In some embodiments, "maintaining" may further comprise applying software updates or applying patches to a server or database.

Today there are many steps administrators must complete to monitor software within an entity. There is a need for developing and deploying a framework for automating and simplifying the process. An example of such framework is the Pega® Platform, which is provided by Pegasystems Inc. of Boston, Mass. It provides for an adaptive, cloud-architected software that empowers people to rapidly deploy, and easily extend and change application to meet strategic business needs, providing capabilities in content and resource management and business process management (BPM). This framework functions to automate the workflow of tasks, building and delivering software.

Embodiments of the present invention provide for executing multiple ruleset version scanning, warning and correction using BPM software, such as the Pega® solution noted above. Embodiments provide efficiency improvements over traditional software deployment processes by automating numerous steps and eliminating the need for human input for various steps in the code scanning and development process.

Embodiments of the invention solve these and other problems by providing a system that executes multiple ruleset version scanning, warning and correction using a Software Deployment Management (SDM) environment such as Pega®. Rules are building blocks of applications and a ruleset or rule-set is a container of rules. A ruleset's primary function is to group rules together for deployment as an application or otherwise. However, rulesets can also be used for the specialization of rules in the same classes, that is, for similar or related rules to be grouped together for a purpose.

A SDM environment such as Pega® may provide best practices for developers coding within the SDM. These best practices may be called guardrails. A weighted compliance score may measure overall compliance of an application with the guardrails. For example, in one guardrail compliance scheme, scores may range from zero (0) to one hundred (100), with one hundred (100) representing the highest possible score. Thresholds may be set, such as a score of ninety (90) or more indicating an application is in good standing, a score in the range of eighty (80) to eighty-nine (89) indicating an application needs review for improvement, and a score below eighty (80) indicating an application requires immediate action.

The result may be converted to a percentage, protecting against any negative values, as outlined in the following formula: $\max(0, 1 - ((10 Sev1u + 5 Sev2u + 2 Sev1j + Sev2j)/\text{Total Remaining Rules})) \times 100$.

Where: $Sev1u$=the number of unjustified, severe (severity level one) warnings in the application; $Sev2u$=the number of unjustified, moderate (severity level two) warnings in the application; $Sev1j$=the number of justified, severe (severity level one) warnings in the application; $Sev2j$=the number of justified, moderate (severity level two) warnings in the application; and Total Remaining Rules=the sum of rules with caution (severity level three) warnings and rules with no warnings in the application. This value excludes property rules and rules that reside in a ruleset.

Embodiments of the invention provide a code scanner tool that scans the rules belonging to multiple rulesets and version(s) and lists both the "out of the box" and customer "Center of Excellence" or enterprise warnings in three severity categories: 1. Severe, 2. Moderate, and 3. Info. An application team may provide a single version or a range of versions of rulesets for scanning by specifying the minimum and maximum versions of the rulesets to be scanned. Rules containing warnings may be edited using the tool and then saved in a portal itself. Embodiments also calculate the release level compliance score based on the algorithm above for each specific ruleset and version captured in the input.

Referring now to FIG. 1, many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 illustrates a system and environment 100 for executing multiple ruleset version scanning, warning and correction, in accordance with embodiments of the invention. As illustrated in FIG. 1, one or more entity systems 10 are operatively coupled, via a network 2, to user computer systems 20, network systems 30, network systems 40, other systems 50, and third party systems 60. In this way, the user 4 (e.g., one or more associates, employees, agents, contractors, sub-contractors, third-party representatives, customers, or the like), through a user application 27 (e.g., code scanning interface and/or tool, software development application, or the like), may access enterprise applications 17 (e.g., code scanning interface and/or tool, software development application, or the like) of the entity systems 10 to execute multiple ruleset version scanning, warning and correction discussed herein. In some embodiments, the user application may be a part of an independent system or environment.

In some embodiments, the network systems 30, the network systems 40, the other systems 50, and the third party systems 60 may be a part of the entity systems 10. The network systems 30, the network systems 40, the other systems 50, and the third party systems 60 may comprise one or more processing devices operatively coupled to the one or more memory devices and configured to execute computer readable code stored in the one or more memory devices. In some embodiments, the network systems 30, the network systems 40, the other systems 50, and the third party systems 60 may be a part of single environment system, wherein the single environment system may be maintained by the entity systems 10.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the network systems 30, the network systems 40, the other systems 50, and the third party systems 60. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like. In one embodiment of the present invention, the one or more processing components 14 automatically implement one or more automated counter measures to mitigate impact of the one or more compliance faults.

As further illustrated in FIG. 1, the entity systems 10 comprise computer-readable instructions 18 stored in the memory component 16, which in one embodiment includes the computer-readable instructions 18 of the entity application 17 (e.g., code scanning interface and/or tool, software development application, or the like). In some embodiments, the one or more memory components 16 include one or more data stores 19 for storing data related to the entity systems 10, including, but not limited to, data created, accessed, and/or used by the entity application 17 and/or the guiderails information gathered according to embodiments of the invention.

Referring back to FIG. 1, users 4 may access the entity application 17, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the user computer systems 20, a plurality of user computer systems 30, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4. In some embodiments of the present invention, an application in the user computer systems 20 and the plurality of user computer systems 30 may enable a code scanning interface to display information associated with the gathering of ruleset data or guiderails information and analytics of the gathered data.

As illustrated in FIG. 1, the user computer systems 20 may have computer-readable instructions 28 stored in the one or more memory components 26, which in one embodiment includes the computer-readable instructions 28 for user applications 27, such as software development application (e.g., apps, applet, or the like), portions of software development application, a code scanning interface and/or tool or other apps that allow the user 4 to take various actions, including allowing the user 4 to access applications located on other systems, or the like. The plurality of user computer systems 30 associated with a plurality of user 5 may include similar structure as that of the user computer systems 20.

Referring now to FIG. 2, a flowchart illustrates a method 200 for executing multiple ruleset version scanning, warning and correction. The first step, as represented by block 205, is to present a code scanning interface to a user. The next step, represented by block 210, is to receive input from the user selecting input rulesets. The input rulesets may include at least one ruleset and at least one version of the ruleset for scanning. The selected rulesets may be indicated by a minimum ruleset version and a maximum ruleset version, thereby indicating a range of ruleset versions to be scanned. Next, as represented by block 215, a guiderail database is accessed. The guiderail database includes a plurality of guiderails configured as best practices for SDM application development. Then, as represented by block 220, the system scans the input rulesets by applying the plurality of guiderails to each of the input rulesets. Next, as represented by block 225, the system determines which of the input rulesets have compliance issues and a severity of each of the compliance issues. Finally, the system presents an indication of severity of compliance issues for each of the input rulesets to the user using the code scanning interface, as represented by block 230.

Referring now to FIG. 3, a flowchart illustrates a method 300 for executing multiple ruleset version correction. The first step, as represented by block 305, is to receive a user's selection of an input ruleset for correction. The next step, as represented by block 310, is to open the selected input ruleset and enable correction of the compliance issue(s). Then, as represented by block 315, the system assigns a new version number to the corrected ruleset. Finally, as represented by block 320, the system saves the corrected input ruleset as a corrected ruleset with the new version number.

Referring now to FIG. 4, a flowchart illustrates a method 400 for executing multiple ruleset version scanning, warning and correction including additional optional process steps that may be included with various other steps discussed herein. First, as represented by block 405, the system receives and stores, as part of the guiderail database, a standard guiderail set and a custom guiderail set. Then, as represented by block 410, is to enable the code scanning interface to accept input regarding which of the standard guiderail set and the custom guiderail set to apply during a scan of input rulesets. Next, as represented by block 415, the system evaluates a compliance score associated with each of the input ruleset versions. Finally, as represented by block 420, the system presents a representation of the compliance score to the user using the code scanning interface.

Figure 5A:
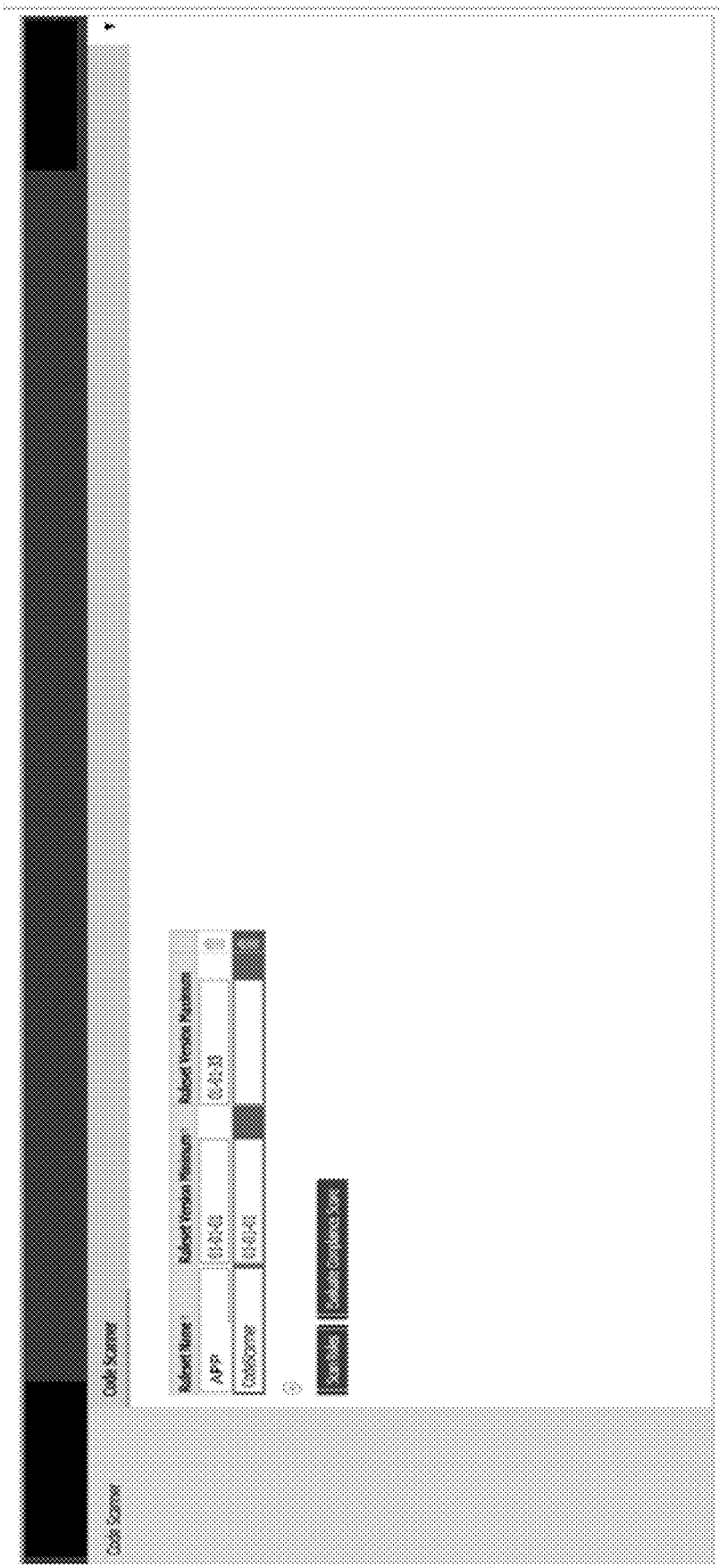

Referring to FIG. 5A, a screenshot of a user interface of a code scanner according to embodiments of the invention is shown. This screenshot shows an interface for providing a ruleset version minimum and a ruleset version maximum for scanning and evaluation of compliance scores.

Figure 5B:
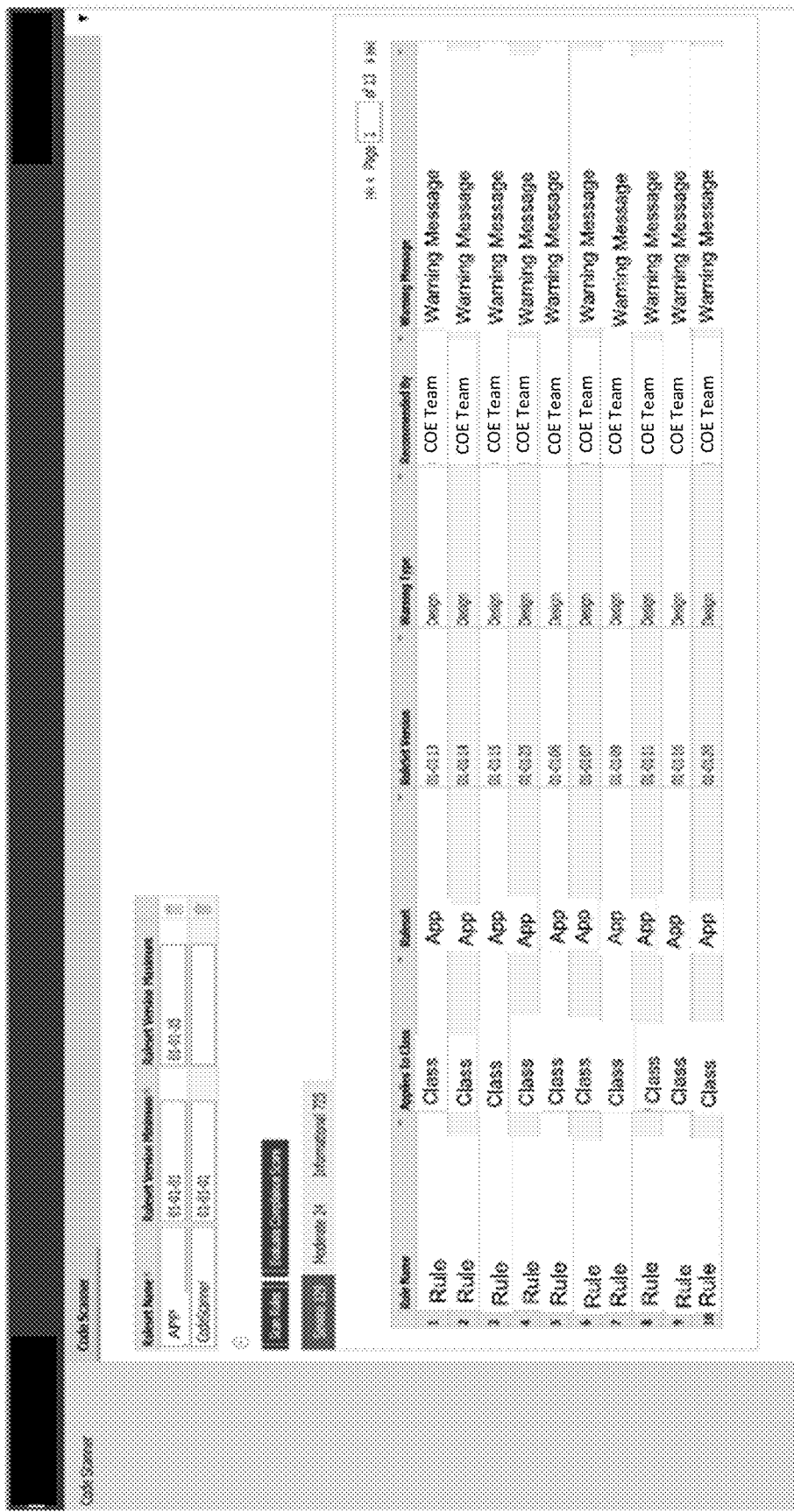

Referring now to FIG. 5B, a screenshot of a user interface of a code scanner according to embodiments of the invention is shown. The screenshot illustrates scan results for a specified range of rulesets, where the results are sorted into categories of severe, moderate and informational.

Figure 5C:
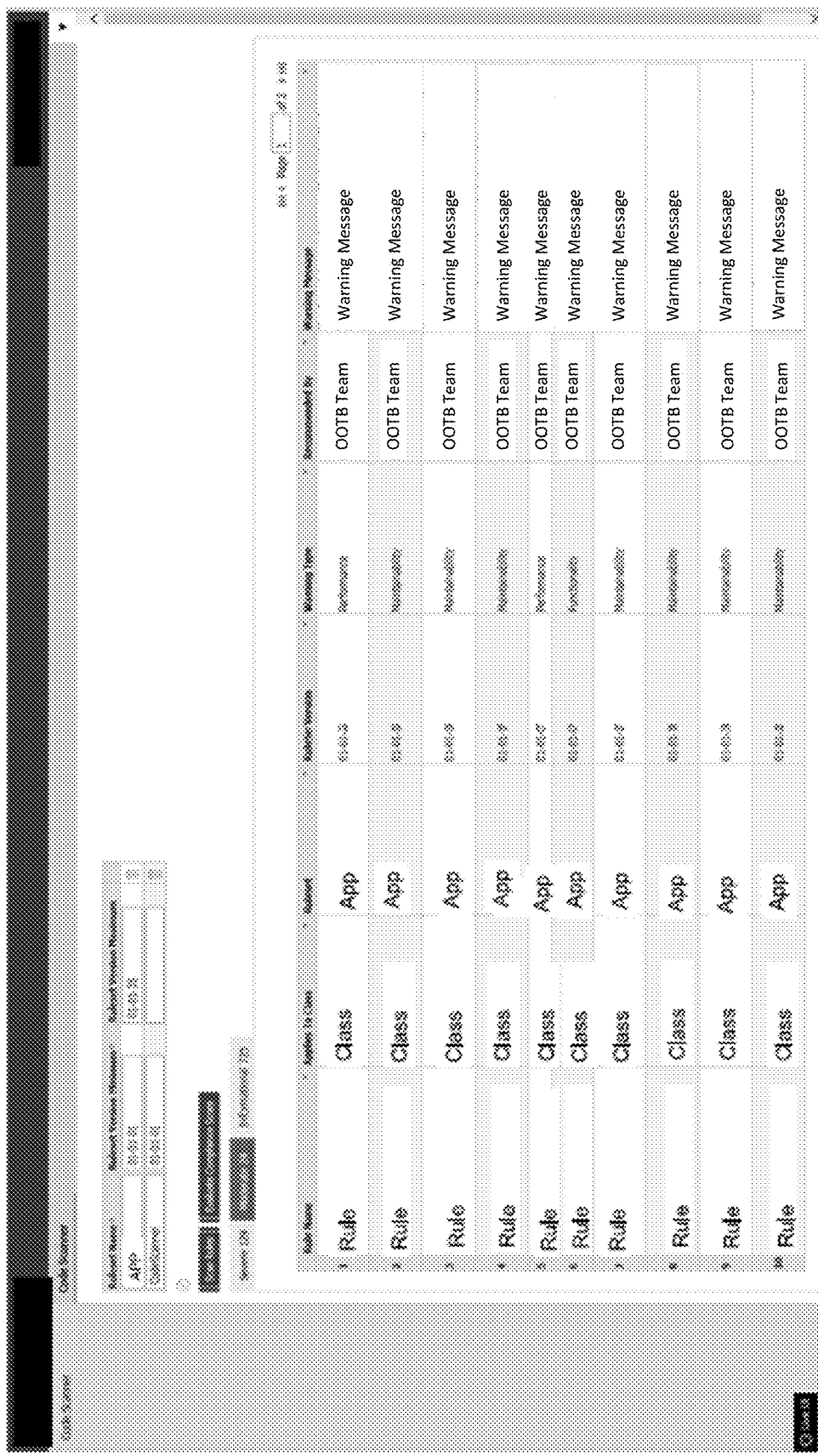

Referring now to FIG. 5C, a screenshot of a user interface of a code scanner according to embodiments of the invention is shown. This screenshot illustrates a list of rules, which class to which the rules apply, which rulesets to which the rules apply, the corresponding ruleset version, warning type, whether the warning is an out of the box (OOTB) warning from the platform provider or a manually created warning, and the warning message for each scan result.

Figure 5D:
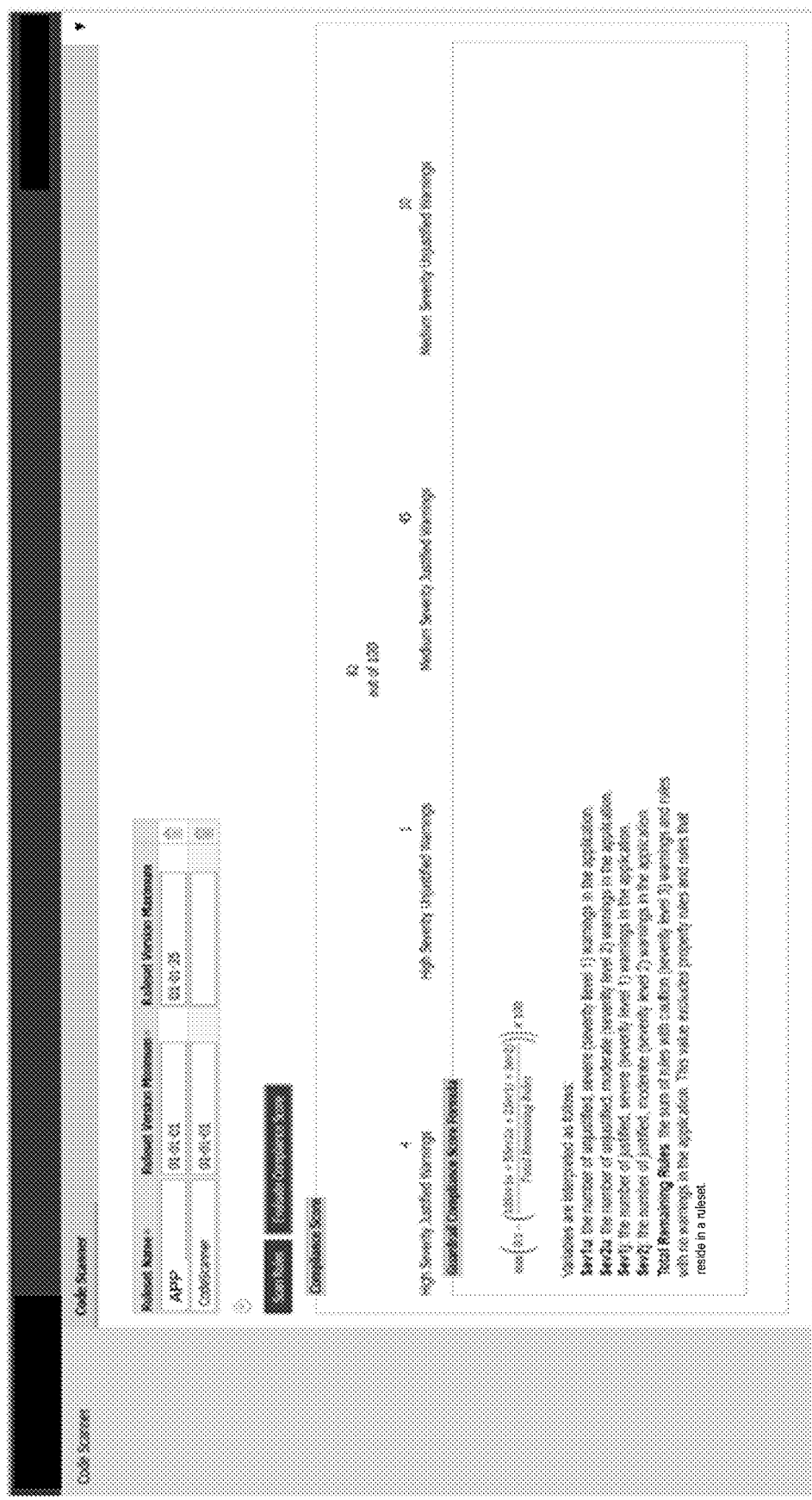

Referring now to FIG. 5D, a screenshot of a user interface of a code scanner according to embodiments of the invention is shown. This screenshot shows results of a compliance score evaluation based on application of the platform provider's score formula for guardrail compliance. The interface shows the number of high severity justified warnings, the number of high severity unjustified warnings, the number of medium severity justified warnings, and the number of medium severity unjustified warnings. The interface also shows both the applied formula and the variable definitions for quick review by a user. The compliance score out of (100) is shown in a conspicuous location in the middle of the interface.

Referring now to FIG. 6, a flowchart illustrates a process for code review according to embodiments of the invention. The development phase includes using the code scanner discussed herein to scan rules (1). Once a warnings count is determined (2), for severe and moderate warnings, the application development team can fix and/or justify the warnings. Then the code scanner can scan the rules again. Typically, if there are only low level warnings, then the process proceeds to the review phase, where the application development team creates a Center of Excellence (CoE) calendar event for code review, reviews the code and logs review comments with the platform provider.

In summary, embodiments of the invention provide a system for enterprise-wide multiple ruleset version scanning, warning and correction using a Software Deployment Management (SDM) environment such as Pega®.

In some embodiments, the invention automatically corrects one or more defects in the code. For example, for particular warning, there may be a standard type of solution that may be implemented automatically within the code such as by changing a portion of code, a call within the code or the target of a call going outside the code, such as to a different program or module outside the code. Embodiments may alter the code in order to implement the fix. In other embodiments, a particular type of warning may indicate two or more possible fixes to the problem and may calculate a percentage chance that a particular fix would work. In some cases, the highest rated fix is automatically implemented, and in some cases, the possible fixes are presented to an administrator for selection of the fix to be implemented. In some cases, once a possible fix is implemented the code is run through a subsequent scan to determine if the same and/or additional warnings are identified. In some cases, the code may be fixed by each of a set of potential fixes and run through the code scanner to determine which of the fixes solves the problem, which may include or be a result without the original warning and/or additional warnings.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A computer implemented method for executing multiple ruleset version scanning, warning and correction using a Software Deployment Management (SDM) environment, the computer implemented method comprising:
   presenting a code scanning interface to a user;
   receiving input from the user selecting input rulesets comprising at least one ruleset, wherein each ruleset provides a ruleset version minimum and a ruleset version maximum and wherein the ruleset version minimum and the ruleset version maximum define a range of ruleset versions for scanning;
   in response to receiving the input access a guiderail database to retrieve comprising a plurality of guiderails stored in the guardrail database that are associated with the at least one ruleset wherein the guiderails are configured as best practices for SDM application development;
   scanning the input rulesets comprising:
      applying at least a portion of the plurality of guiderails to each of the input rulesets and each of the ruleset versions within the range of ruleset versions; and
      determining which of the input rulesets and ruleset versions comprise compliance issues and a severity of each of the compliance issues; and
   presenting an indication of severity of compliance issues for each of the input rulesets and each version within the range of ruleset versions to the user using the code scanning interface, wherein the indication of the severity of compliance issues includes display within the code scanning interface of a sortable listing of each of the input rulesets and each ruleset version within the range of ruleset versions that categorizes the severity of compliance issues in categories, wherein the categories are based on a compliance score and include an information category, a moderate category and a severe category.

2. The computer-implemented method of claim 1, further comprising:
   receiving a user's selection of an input ruleset for correction;
   opening the selected input ruleset and enable correction of the compliance issue; and
   saving the corrected input ruleset as a corrected ruleset.

3. The computer-implemented method of claim 2, further comprising:
   assigning a new version number to the corrected ruleset; and
   saving the corrected ruleset as the new version number.

4. The computer-implemented method of claim 1, further comprising:
   receiving and store as part of the guiderail database a standard guiderail set and a custom guiderail set.

5. The computer-implemented method of claim 4, further comprising:
   enabling the code scanning interface to accept input regarding which of the standard guiderail set and the custom guiderail set to apply during a scan of input rulesets.

6. A system for executing multiple ruleset version scanning, warning and correction using a Software Deployment Management (SDM) environment, the system comprising:
   one or more memory devices;
   one or more hardware processors operatively coupled with the one or more memory devices, wherein the hardware processors are configured to execute computer-readable program code to:
   present a code scanning interface to a user;
   receive input from the user selecting input rulesets comprising at least one ruleset, wherein each ruleset provides a ruleset version minimum and a ruleset version maximum and wherein the ruleset version minimum and the ruleset version maximum define a range of ruleset versions for scanning;

in response to receiving the input, access a guiderail database to retrieve a plurality of guiderails stored in the guardrail database that are associated with the at least one ruleset, wherein the guiderails are configured as best practices for SDM application development;

scan the input rulesets comprising:
  applying at least a portion of the plurality of guiderails to each of the input rulesets and each of the ruleset versions within the range of ruleset versions, and
  determining which of the input rulesets and the ruleset versions comprise compliance issues and a severity of each of the compliance issues; and present an indication of severity of compliance issues for each of the input rulesets and each version within the range of ruleset versions to the user using the code scanning interface, wherein the indication of the severity of compliance issues includes display within the code scanning interface of a sortable listing of each of the input rulesets and each ruleset version within the range of ruleset versions that categorizes the severity of compliance issues in categories, wherein the categories are based on a compliance score and include an information category, a moderate category and a severe category.

7. The system of claim 6, wherein the hardware processors are further configured to execute computer-readable program code to:
  receive a user's selection of an input ruleset for correction;
  open the selected input ruleset and enable correction of the compliance issue; and
  save the corrected input ruleset as a corrected ruleset.

8. The system of claim 7 wherein the hardware processors are further configured to execute computer-readable program code to:
  assign a new version number to the corrected ruleset; and
  save the corrected ruleset as the new version number.

9. The system of claim 6, wherein the hardware processors are further configured to execute computer-readable program code to:
  receive and store as part of the guiderail database a standard guiderail set and a custom guiderail set.

10. The system of claim 9, wherein the hardware processors are further configured to execute computer-readable program code to:
  enable the code scanning interface to accept input regarding which of the standard guiderail set and the custom guiderail set to apply during a scan of input rulesets.

11. The system of claim 6, wherein the hardware processors are further configured to execute computer-readable program code to:
  determine the a compliance score for each of the input rulesets and each of the ruleset versions within the range of ruleset versions; and
  present a representation of the compliance score to the user using the code scanning interface.

12. A computer program product for executing multiple ruleset version scanning, warning and correction using a Software Deployment Management (SDM) environment, wherein the computer program product comprises at least one non-transitory computer readable medium comprising computer readable instructions, the instructions, when executed by a computer processor, cause the computer processor to:
  present a code scanning interface to a user;
  receive input from the user selecting input rulesets comprising at least one ruleset, wherein each ruleset provides a ruleset version minimum and a ruleset version maximum and wherein the ruleset version minimum and the ruleset version maximum define a range of ruleset versions for scanning;
  in response to receiving the input, access a guiderail database to retrieve a plurality of guiderails stored in the guardrail database, wherein the guiderails are configured as best practices for SDM application development;
  scan the input rulesets comprising:
    applying at least a portion of the plurality of guiderails to each of the input rulesets and each of the ruleset versions within the range of ruleset versions; and
    determining which of the input rulesets and ruleset versions comprise compliance issues and a severity of each of the compliance issues; and
  present an indication of severity of compliance issues for each of the input rulesets and each version within the range of ruleset versions to the user using the code scanning interface, wherein the indication of the severity of compliance issues includes display within the code scanning interface of a sortable listing of each of the input rulesets and each ruleset version within the range of ruleset versions that categorizes the severity of compliance issues in categories, wherein the categories are based on a compliance score and include an information category, a moderate category and a severe category.

13. The computer program product of claim 12, wherein the computer readable instructions further cause the computer processor to:
  receive a user's selection of an input ruleset for correction;
  open the selected input ruleset and enable correction of the compliance issue; and
  save the corrected input ruleset as a corrected ruleset.

14. The computer program product of claim 13, wherein the computer readable instructions further cause the computer processor to:
  assign a new version number to the corrected ruleset; and
  save the corrected ruleset as the new version number.

15. The computer program product of claim 12, wherein the computer readable instructions further cause the computer processor to:
  receive and store as part of the guiderail database a standard guiderail set and a custom guiderail set.

16. The computer program product of claim 15, wherein the computer readable instructions further cause the computer processor to:
  enable the code scanning interface to accept input regarding which of the standard guiderail set and the custom guiderail set to apply during a scan of input rulesets.

17. The computer program product of claim 12, wherein the computer readable instructions further cause the computer processor to:
  determine the a compliance score for each of the input rulesets and each of the ruleset versions within the range of ruleset versions; and
  present a representation of the compliance score to the user using the code scanning interface.

* * * * *